US010175480B2

(12) United States Patent
Zhao et al.

(10) Patent No.: US 10,175,480 B2
(45) Date of Patent: Jan. 8, 2019

(54) HEAD UP DISPLAY DEVICE THAT PREVENTS GHOSTING AND VEHICLE

(71) Applicant: BOE TECHNOLOGY GROUP CO., LTD., Beijing (CN)

(72) Inventors: Kening Zhao, Beijing (CN); Chao Ma, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 84 days.

(21) Appl. No.: 15/166,532

(22) Filed: May 27, 2016

(65) Prior Publication Data

US 2017/0017079 A1    Jan. 19, 2017

(30) Foreign Application Priority Data

Jul. 13, 2015 (CN) .......................... 2015 1 0408659

(51) Int. Cl.
*G09G 5/00* (2006.01)
*G02B 27/01* (2006.01)
*H04N 9/31* (2006.01)
*G02B 27/00* (2006.01)

(52) U.S. Cl.
CPC ..... *G02B 27/0101* (2013.01); *G02B 27/0018* (2013.01); *H04N 9/3185* (2013.01); *G02B 2027/013* (2013.01)

(58) Field of Classification Search
None
See application file for complete search history.

(56) References Cited

U.S. PATENT DOCUMENTS 5,005,009 A * 4/1991 Roberts ............. B32B 17/10036
340/980
5,013,134 A * 5/1991 Smith ............... B32B 17/10568
345/7
(Continued)

FOREIGN PATENT DOCUMENTS

CN    101038349 A    9/2007
CN    101750737 A    6/2010
(Continued)

OTHER PUBLICATIONS

Thermal Insulation, https://omnexus.specialchem.com/polymer-properties/properties/thermal-insulation, p. 1.*
(Continued)

*Primary Examiner* — Abdul-Samad A Adediran
*Assistant Examiner* — Kirk Hermann
(74) *Attorney, Agent, or Firm* — Nath, Goldberg & Meyer; Joshua B. Goldberg

(57) ABSTRACT

The present invention provides a head up display device and a vehicle. The head up display device comprises an arc-shaped screen configured to display information which is to be displayed and projected onto the screen, and to reflect displayed information to human eyes. The head up display device further comprises a transparent film provided on the screen, and the transparent film is configured to change a direction of a light ray reflected by the screen, such that ghosting is prevented from occurring in the displayed information which is reflected into the human eyes.

9 Claims, 2 Drawing Sheets

(56) References Cited

U.S. PATENT DOCUMENTS

| | | | | |
|---|---|---|---|---|
| 5,812,332 | A * | 9/1998 | Freeman | B32B 3/02 |
| | | | | 359/894 |
| 6,159,608 | A * | 12/2000 | Friedman | B32B 7/12 |
| | | | | 428/442 |
| 8,764,923 | B2 * | 7/2014 | Durbin | B29C 55/045 |
| | | | | 156/102 |
| 2002/0086141 | A1 | 7/2002 | Sauer | |
| 2007/0148472 | A1 * | 6/2007 | Masaki | B32B 17/10036 |
| | | | | 428/426 |
| 2013/0188260 | A1 * | 7/2013 | Matsushita | B60K 35/00 |
| | | | | 359/632 |
| 2015/0131158 | A1 * | 5/2015 | Chen | G02B 27/0101 |
| | | | | 359/630 |
| 2015/0251377 | A1 * | 9/2015 | Cleary | B32B 3/263 |
| | | | | 428/172 |
| 2016/0070100 | A1 * | 3/2016 | Miura | B60K 35/00 |
| | | | | 359/630 |
| 2016/0091716 | A1 * | 3/2016 | Larson | G02B 27/0101 |
| | | | | 359/631 |
| 2016/0187650 | A1 * | 6/2016 | Mills | A42B 3/042 |
| | | | | 345/8 |
| 2017/0003503 | A1 * | 1/2017 | Arndt | B32B 17/10036 |

FOREIGN PATENT DOCUMENTS

| | | |
|---|---|---|
| CN | 101888927 A | 11/2010 |
| CN | 104267499 A | 1/2015 |
| CN | 204360020 U | 5/2015 |
| EP | 0420228 A2 | 4/1991 |
| EP | 0620469 A1 | 10/1994 |
| WO | 2015086234 A1 | 6/2015 |

OTHER PUBLICATIONS

Office Action dated Nov. 11, 2016 for corresponding CN application 201510408659.5, with English translation.

* cited by examiner

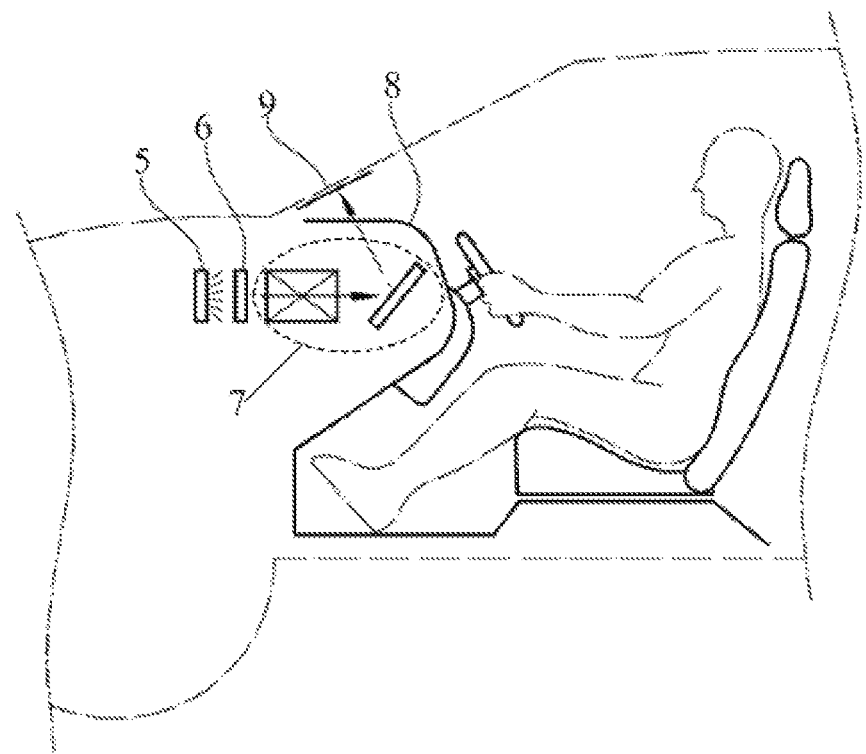
FIG. 2
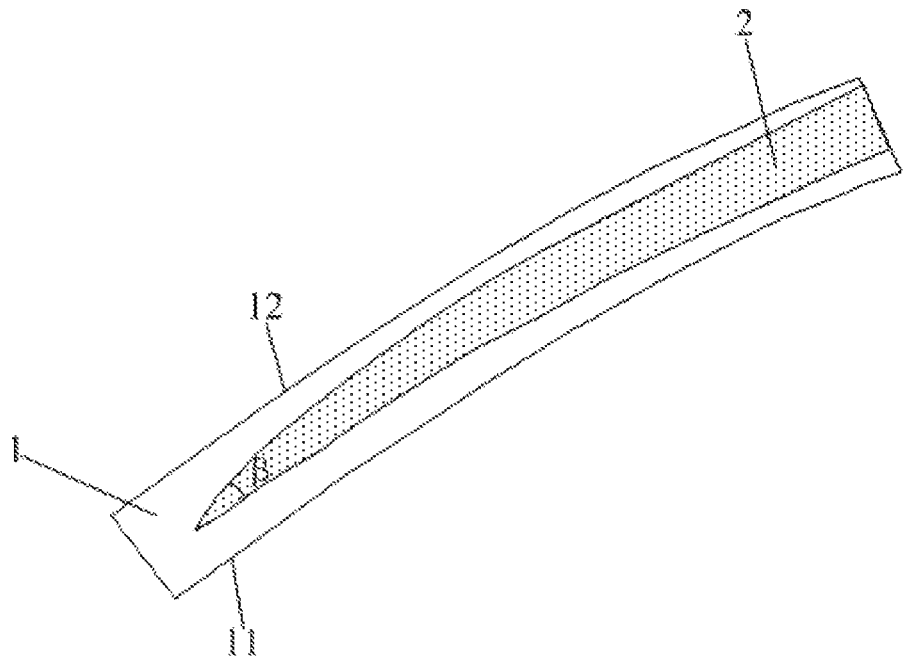

HEAD UP DISPLAY DEVICE THAT PREVENTS GHOSTING AND VEHICLE

CROSS-REFERENCE TO RELATED APPLICATIONS

The present application claims the priority of Chinese Patent Application No. 201510408659.5, filed on Jul. 13, 2015, the contents of which are incorporated herein in their entirety by reference.

FIELD OF THE INVENTION

The present invention relates to the field of display technology, and in particular, relates to a head up display device and a vehicle.

BACKGROUND OF THE INVENTION

A head up display (HUD) of an automobile is adopted to ensure the security and stability of driving by a driver, such that the driver can see relevant information without lowering his/her head, and can pay more attention to the road condition. Thus, the visual fatigue of the driver due to frequently switching between viewpoints can be mitigated. A conventional HUD displays information mainly by projecting the information onto a front windshield of the HUD.

Since the front windshield has a certain thickness, for example, of 5 mm to 8 mm, the light is reflected at both an inner surface and an outer surface of the front windshield, respectively. In addition, since the front windshield has a certain curvature, ghosting will occur when the light reflected at the inner surface of the front windshield and the light reflected at the outer surface of the front windshield enter into the eyes of the driver. The ghosting will result in an error of recognition by the eyes of the driver, and will distract the driver from driving. Thus, at the present, how to eliminate the ghosting in the automobile-mounted HUD is a technical problem to be solved urgently.

At present, there exist two methods commonly used for eliminating the ghosting. In one method, the HUD includes a flat glass screen. However, the flat glass screen occupies certain space on the central console which has a limited size, thus the flat glass screen included in the HUD may easily block a portion of the windshield. In the other method, a polarizer film is provided in the front windshield to prevent the light reflected at the outer surface of the front windshield from emitting from the inner surface of the front windshield by using polarization of the light, such that the ghosting is eliminated. Both of these two methods cause a dark region having a certain area to appear in a portion of the front windshield which is in front of the driver, which reduces the security of driving by the driver.

SUMMARY OF THE INVENTION

In view of the technical problems existing in the prior art, the present invention provides a head up display device and a vehicle. When displaying, a screen of the head up display device enables a light ray reflected at an inner surface of the screen and a light ray reflected at an outer surface of the screen to enter human eyes in parallel, such that the ghosting will not occur in the displayed information reflected from the screen into the human eyes, thereby an error of recognition by the human eyes is avoided.

The present invention provides a head up display device, including an arc-shaped screen configured to display information which is to be displayed and projected onto the screen, and to reflect displayed information to human eyes, wherein, the head up display device further includes a transparent film provided on the screen, the transparent film is configured to change a direction of a light ray reflected by the screen, such that ghosting is prevented from occurring in the displayed information which is reflected into the human eyes.

Optionally, the screen is a glass screen; and the transparent film is provided on an inner side of the glass screen or provided in the interior of the glass screen, and a curvature radius of the inner side of the glass screen is less than that of an outer side of the glass screen.

Optionally, the transparent film is arc-shaped, has a curvature matching to that of the screen, and has a bending direction matching to that of the screen.

Optionally, the transparent film is arc-shaped, has a curvature matching to that of the glass screen, and has a bending direction matching to that of the glass screen.

Optionally, a section of the transparent film taken along a thickness direction of the screen appears as a wedge, and two sides of the wedge corresponding to an outer side and an inner side of the screen intersect with each other to form a wedge angle of the wedge.

Optionally, a section of the transparent film taken along a thickness direction of the glass screen appears as a wedge, and two sides of the wedge corresponding to an outer side and an inner side of the glass screen intersect with each other to form a wedge angle of the wedge.

Optionally, the displayed information is projected onto the inner side of the screen, the wedge angle is $\beta$ and satisfies $\beta=(2-n) \times n_2 \alpha/2n^2$, where n is a refractive index of the screen, $n_2$ is a refractive index of the transparent film, and $\alpha=nL(R+h)/Rh$, where L is a distance between an incidence point where a light ray is incident on the inner side of the screen and an exit point where the same light ray exits from the inner side of the screen, R is a curvature radius of the inner side of the screen, and h is a thickness of the screen.

Optionally, the displayed information is projected onto the inner side of the glass screen, the wedge angle is $\beta$ and satisfies $\beta=(2-n) \times n_2 \alpha/2n^2$, where n is a refractive index of the glass screen, $n_2$ is a refractive index of the transparent film, and $\alpha=nL(R+h)/Rh$, where L is a distance between an incidence point where a light ray is incident on the inner side of the glass screen and an exit point where the same light ray exits from the inner side of the glass screen, R is a curvature radius of the inner side of the glass screen, and h is a thickness of the glass screen.

Optionally, $|n-n_2| \leq 0.3$.

Optionally, the transparent film is made of a material having thermal insulation properties.

The present invention further provides a vehicle including the head up display device as described above.

Optionally, the screen is a glass screen; and the glass screen of the head up display device serves as a front windshield of the vehicle, a position where the transparent film of the head up display device is provided on the front windshield corresponds to positions of the human eyes, and the wedge angle of the transparent film is close to a lower side of the front windshield.

Optionally, the screen is a glass screen; and the vehicle includes an automobile, a train, or an airplane.

The advantageous technical effects of the present invention are as follows. The head up display device provided by the present invention, by including the transparent film on the screen, enables a light ray reflected at the inner surface of the screen and a light ray reflected at the outer surface of the screen to enter human eyes in parallel when the screen displays, such that the ghosting will not occur in the displayed information reflected from the screen into the human eyes, thereby an error of recognition by the human eyes is avoided.

The vehicle provided by the present invention prevents the ghosting from occurring in the information displayed on the front windshield of the vehicle, since the front windshield of the vehicle is the screen of the head up display device provided by the present invention, thereby ensuring the security of driving by a driver.

BRIEF DESCRIPTION OF THE DRAWINGS

FIG. 1 is a schematic diagram showing a structure of an automobile-mounted head up display according to some embodiments of the present invention;

FIG. 2 is a sectional view showing a structure of a head up display device according to a first embodiment of the present invention;

DESCRIPTION OF REFERENCE SIGNS

Figure 3:
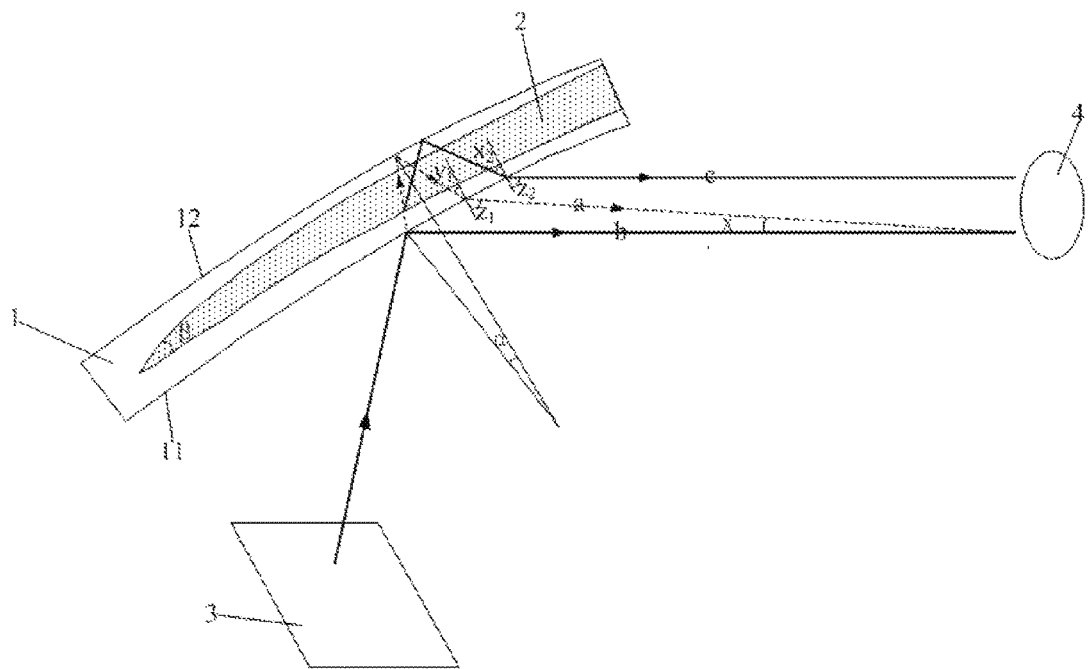
FIG. 3 is a schematic diagram showing light paths of the head up display device shown in FIG. 2 which eliminate ghosting.

1—glass screen, 11—inner side, 12—outer side, 2—transparent film, 3—processing unit, 4—human eye, 5—backlight, 6—liquid crystal display, 7—relay optical system, 8—central console, 9—front windshield, a—a light ray reflected at an outer side of a glass screen without a transparent film provided thereon, b—a light ray reflected at an inner side of a glass screen, c—a light ray reflected at an outer side of a glass screen provided with a transparent film.

DETAILED DESCRIPTION OF THE EMBODIMENTS

To make those skilled in the art better understand the technical solutions of the present invention, a head up display device and a vehicle provided by the present invention will be described below in detail with reference to the accompanying drawings and the following embodiments.

Some embodiments of the present invention provide an automobile-mounted HUD. As shown in FIG. 1, the automobile-mounted HUD includes a backlight 5, a liquid crystal display 6, a relay optical system 7, a central console 8, and a front windshield 9. The light emitted from the backlight 5 passes through the liquid crystal display 6, and is amplified and reflected by the relay optical system 7, then is emitted from the right upside of the central console 8, finally is reflected by the front windshield 9 into the eyes of a driver. An image is actually formed at a position which is 2 m to 3 m away from the driver and is in a plane coinciding with a surface of the road.

First Embodiment

The present embodiment provides a head up display device. As shown in FIG. 2, the head up display device includes an arc-shaped glass screen 1 configured to display information which is to be displayed and projected onto the glass screen (i.e., to reflect a light ray projected onto the glass screen), and to reflect displayed information (i.e., the light ray) to a human eye 4. The head up display device further includes a transparent film 2 provided on the glass screen 1, and the transparent film 2 is configured to change a direction of a light ray reflected by the glass screen 1, such that ghosting is prevented from occurring in the displayed information which is reflected into the human eye 4.

It should be noted that, in the present invention, the glass screen 1 is only taken as an example, and the present invention is not limited thereto. For example, the screen 1 may be made of a transparent material such as glass, resin or the like. In a case where the screen 1 has such a small size that it will not block the visual field of a viewer, the screen 1 may even be made of a translucent material or a non-transparent material.

Thus, by including the transparent film 2 on the glass screen 1, a light ray reflected at the inner surface of the glass screen 1 and a light ray reflected at the outer surface of the glass screen 1 can enter the human eye 4 in parallel when the glass screen 1 displays, such that the ghosting will not occur in the displayed information reflected from the glass screen 1 into the human eye 4, thereby an error of recognition by the human eye 4 is avoided.

In the present embodiment, the transparent film 2 is provided in the interior of the glass screen 1, and a curvature radius of an inner side 11 of the glass screen 1 is less than that of an outer side 12 of the glass screen 1.

It should be noted that, in the present invention, both the inner side 11 and the outer side 12 may be spherical surfaces and have a same center of sphere.

In the present embodiment, the transparent film 2 is arc-shaped, has a curvature matching to that of the glass screen 1, and has a bending direction matching to that of the glass screen 1, such that the transparent film 2 can be provided in the interior of the glass screen 1 seamlessly. With such configuration, it is ensured that a direction of a light ray reflected by the glass screen 1 is changed by the transparent film 2, and a light ray reflected at the inner surface 11 of the glass screen 1 and a light ray reflected at the outer surface 12 of the glass screen 1 exit in parallel, thereby preventing ghosting from occurring in the displayed information which is reflected from the glass screen 1 into the human eye 4.

In the present embodiment, a section of the transparent film 2 taken along a thickness direction of the glass screen 1 appears as a wedge, and two sides of the wedge corresponding to the outer side 12 and the inner side 11 of the glass screen 1 intersect with each other to form a wedge angle of the wedge. The transparent film 2 may be provided so that an end where the wedge angle of the transparent film 2 is located is directed approximately in a direction from the head of a viewer to the feet of the viewer during the head up display device being in use. The displayed information is projected onto the inner side 11 of the glass screen 1. The wedge angle is $\beta$ and satisfies the equation of $\beta=(2-n) \times n_2 \alpha / 2n^2$, where n is a refractive index of the glass screen 1, $n_2$ is a refractive index of the transparent film 2, and $\alpha=nL(R+h)/Rh$, where L is a distance between an incidence point where a light ray is incident on the inner side 11 of the glass screen 1 and an exit point where the same light ray exits from the inner side 11 of the glass screen 1, R is a curvature radius of the inner side 11 of the glass screen 1 (It should be noted that, R should be a curvature radius corresponding to a position where the transparent film 2 is provided on the glass screen 1. For example, in a case where the transparent film 2 is provided at a position inside the glass screen 1, R should be a curvature radius corresponding to this position. However, since the curvature radius of the inner side 11 of the glass screen 1 is larger than the thickness of the glass screen 1 by two orders of magnitude, a difference between a curvature radius of the outer side 12 of the glass screen 1 and the curvature radius of the inner side 11 of the glass screen 1 is very small, R can always takes the curvature radius of the inner side 11 of the glass screen 1 in calculation.), and h is a thickness of the glass screen 1. With such configuration, the transparent film 2 can effectively eliminate the ghosting occurring in the displayed information reflected by the glass screen 1.

It should be noted that, in the present embodiment, the thickness of the glass screen 1 generally ranges from 5 mm to 8 mm, the thickness of the transparent film 2 ranges from 0.3 mm to 0.8 mm, thus the thickness of the transparent film 2 is very small relative to that of the glass screen 1. Therefore, the above parameters L, R and h may be either those in a case where the glass screen 1 is not provided with the transparent film 2 or those in a case where the transparent film 2 is provided in the interior of the glass screen 1.

In the present embodiment, $|n-n_2| \leq 0.3$ i.e., an absolute value of a difference between the refractive index n of the glass screen 1 and the refractive index $n_2$ of the transparent film 2 is less than or equal to 0.3. That is, the refractive index of the transparent film 2 is close to that of the glass screen 1. With such configuration, the transparent film 2 can effectively eliminate the ghosting occurring in the displayed information reflected by the glass screen 1.

As shown in FIG. 3, the principle that the transparent film 2 eliminates the ghosting occurring in the displayed information reflected by the glass screen 1 will be described below.

In the present embodiment, in order to eliminate the ghosting occurring in the displayed information reflected by the glass screen 1 through the transparent film 2, the transparent film 2 is configured to change a propagation direction of a light ray reflected by the glass screen 1, such that a light ray reflected at the outer side 12 of the glass screen 1 does not interfere with that reflected at the inner side 11 of the glass screen 1. Thus, light rays entering the human eye 4 correspond to projected light rays one to one, and the ghosting is avoided.

First, propagation directions of a light ray a reflected at the outer side 12 and a light ray b reflected at the inner side 11 in a case where the glass screen 1 is not provided with the transparent film 2 are analyzed. According to the geometrical relation of light propagation, an angle x between the light ray b reflected at the inner side 11 of the glass screen 1 and the light ray a reflected at the outer side 12 of the glass screen 1 is twice as large as a central angle α between the two reflection positions (i.e., between connection lines connecting a reflection point where the light ray is reflected at the inner side 11 and a reflection point where the light ray is reflected at the outer side 12 to the common center of sphere of the inner side 11 and the outer side 12, respectively). In other words, a light ray is reflected at the inner side 11 of the glass screen 1, and then is reflected at the outer side 12 of the glass screen 1; the central angle α is a central angle corresponding to an arc of the inner side 11 between the two connection lines connecting two reflection points where the light ray is reflected at the inner side 11 and at the outer side 12 to the common center of sphere, respectively. According to parameters such as the thickness of the glass screen 1, a refractive index (which generally ranges from 1.3 to 1.4) of a material of the glass screen 1, and the like, the central angle α may be calculated as α=nL(R+h)/Rh, where n is the refractive index of the glass screen 1, L is a distance between an incidence point where a light ray is incident on the inner side 11 of the glass screen 1 and an exit point where the same light ray exits from the inner side 11 of the glass screen 1, R is the curvature radius of the inner side 11 of the glass screen 1, and h is the thickness of the glass screen 1. As stated above, the angle x between the outgoing light ray b reflected at the inner side 11 of the glass screen 1 and the outgoing light ray a reflected at the outer side 12 of the glass screen 1 satisfies x=2α. That is, an angle difference between the light ray a reflected at the outer side 12 and the light ray b reflected at the inner side 11 is x.

In order to avoid ghosting, it needs to cause the light ray a reflected at the outer side 12 and the light ray b reflected at the inner side 11 to exit in parallel. That is, it needs to cause the light ray a reflected at the outer side 12 to rotate by the angle x counterclockwise by providing the transparent film 2, such that the light ray b reflected at the inner side 11 of the glass screen 1 and an outgoing light ray c after reflection at the outer side 12 of the glass screen 1 are parallel to each other. A propagation direction of a light ray can be changed by providing the transparent film 2 having the wedge angle of β in the interior of the glass screen 1, so that the outgoing light ray a after reflection at the outer side 12 rotates by the angle x counterclockwise to become the outgoing light ray c.

The principle that the transparent film 2 having the wedge angle of β changes light paths will be described below. A deflection angle $x_1$ between an angle at which a light ray is incident on the transparent film 2 and an angle at which the light ray exits from the transparent film 2 satisfies $x_1=2\times\beta/n_1$ (the deflection angle $x_1$ is not shown in FIG. 3), where $n_1$ is a ratio $n_2/n$ of the refractive index $n_2$ of the transparent film 2 to the refractive index n of the glass screen 1. The light ray reflected at the outer side 12 passes through the transparent film 2, and then is incident on the inner side 11 at an angle $x_2$, and $x_2=x_1+\alpha-y_1$, where $y_1$ is an incidence angle at which the light ray reflected at the outer side 12 is incident on the inner side 11 in a case where the glass screen 1 is not provided with the transparent film 2. In FIG. 3, the incidence angle $y_1$ corresponds to a refraction angle $z_1$ to be described later. Herein, $z_2$ is used for denoting a refraction angle of the outgoing light ray c, which is resulted from that the light ray reflected at the outer side 12 passes through the transparent film 2 and then exits from the inner side 11 in a case where the transparent film 2 is provided in the interior of the glass screen 1, and $z_1$ is used for denoting a refraction angle of the outgoing light ray a, which is resulted from that the light ray reflected at the outer side 12 exits from the inner side 11 in a case where the transparent film 2 is not provided in the interior of the glass screen 1. According to the Malus law, the refraction angle $z_2$ satisfies the equation of $z_2=x_2\times n$. Thus, a relationship between the refraction angle $z_2$ and the wedge angle β can be obtained as $z_2=(2\times\beta/n_1+\alpha+y_1)\times n$. The refraction angle $z_1$ satisfies the equation of $z_1=y_1\times n$. Since the refraction angle $z_2$ rotates $\Delta z=z_2-z_1=(2\times\beta/n_1+\alpha)\times n$ counterclockwise relative to the refraction angle $z_1$, and $\Delta z=x=2\alpha$, an equation for calculating the wedge angle β as $\beta=(2-n)\times n_2\alpha/2n^2$ may be obtained after calculation.

In a practical application, by adjusting the parameters relating to the wedge angle β including those associated with the glass screen 1 including the transparent film 2 according to the equation for calculating the wedge angle β, the ghosting resulted from the light ray reflected at the inner side 11 of the glass screen 1 and that reflected at the outer side 12 of the glass screen 1 can be eliminated.

In the present embodiment, the transparent film 2 may be made of a material having thermal insulation properties. The transparent film 2 has a light transmittance of 80% or more in the case of visible light, and has a light reflectance of 90% or more in the case of infrared light and ultraviolet light. These properties make the provision of the transparent film 2 increase a reflectance of the displayed information by the glass screen 1, and enhance the performance of the glass screen 1 to insulate heat and to reflect ultraviolet light at the same time, thereby further enhancing the display performance of the glass screen 1.

In the present embodiment, the head up display device may further include a processing unit 3 configured to process the information to be displayed and to project the processed information onto the glass screen 1. The processing unit 3 includes a backlight, a liquid crystal display and a relay optical system. The light emitted from the backlight is incident on the liquid crystal display, the liquid crystal display displays the information to be displayed on the glass screen 1, the information to be displayed is amplified and reflected by the relay optical system, then is projected onto the inner side 11 of the glass screen 1, next is reflected at the inner side 11 and the outer side 12 of the glass screen 1, finally enters into the human eye 4 and is perceived by the human eye 4.

Second Embodiment

Figure 4:
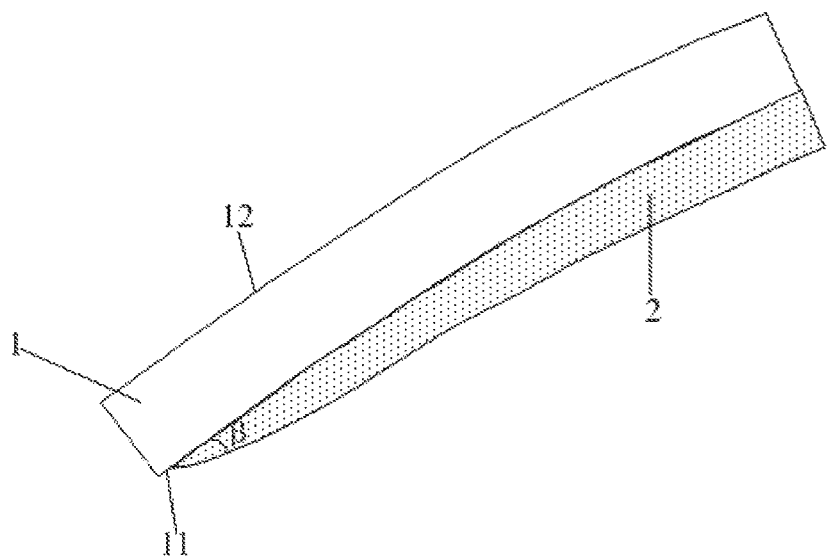
FIG. 4 is a sectional view showing a structure of a head up display device according to a second embodiment of the present invention.

The present embodiment provides a head up display device, which differs from that according to the first embodiment in that the transparent film 2 is provided on the inner side 11 of the glass screen 1, as shown in FIG. 4.

It should be noted that, in the present embodiment, the transparent film 2 is arc-shaped, has a curvature matching to that of the glass screen 1, and has a bending direction matching to that of the glass screen 1, such that the transparent film 2 can be provided on the inner side 11 of the glass screen 1 seamlessly.

Other structures and the principle that the transparent film 2 changes light paths of the head up display device according to the present embodiment are the same as those of the head up display device according to the first embodiment, and the description thereof will be omitted herein.

The advantageous technical effects of the first and second embodiments are as follows. The head up display device provided by the first and second embodiments, by including the transparent film on the glass screen, enables a light ray reflected at the inner surface of the glass screen and a light ray reflected at the outer surface of the glass screen to enter human eyes in parallel when the glass screen displays, such that the ghosting will not occur in the displayed information reflected from the glass screen into the human eyes, thereby an error of recognition by the human eyes is avoided.

Third Embodiment

The present embodiment provides a vehicle including the head up display device according to any one of the first and second embodiments.

In the present embodiment, the glass screen 1 of the head up display device serves as a front windshield of the vehicle, a position where the transparent film 2 of the head up display device is provided on the front windshield corresponds to positions of the human eyes, and the wedge angle of the transparent film 2 is close to a lower side of the front windshield. With such configuration, ghosting is prevented from occurring in the information displayed on the front windshield, thus the security of driving by a driver is ensured. Furthermore, in order to see the information displayed on the front windshield, the driver just needs to look straight forward at the front windshield. Thus, the requirement for the driver to frequently switch between different fields of view to obtain information about driving is avoided, thereby ensuring the security of driving by the driver.

In the present embodiment, the vehicle includes an automobile, a train, or an airplane.

The advantageous technical effects of the third embodiment are as follows. The vehicle provided by the third embodiment prevents the ghosting from occurring in the information displayed on the front windshield of the vehicle, since the front windshield of the vehicle is the glass screen of the head up display device provided by the present invention, thereby ensuring the security of driving by a driver.

It should be understood that, the foregoing embodiments are only exemplary embodiments used for explaining the principle of the present invention, but the present invention is not limited thereto. Various variations and improvements may be made by a person skilled in the art without departing from the protection scope of the present invention, and these variations and improvements also fall into the protection scope of the present invention.

What is claimed is:

1. A head up display device, comprising an arc-shaped screen configured to display information which is to be displayed and projected onto the screen, and to reflect the information to human eyes, wherein the head up display device further comprises a transparent film provided on the screen, the transparent film is configured to change a direction of a light ray reflected at an inner or outer surface of the screen, such that the light ray reflected at the inner surface of the screen and the light ray reflected at the outer surface of the screen exit at different positions on the inner surface and enter the human eyes in parallel when the screen displays, and ghosting is prevented from occurring in the information which is reflected into the human eyes;

wherein a section of the transparent film taken along a thickness direction of the screen appears as a wedge, and two sides of the wedge corresponding to an outer side and an inner side of the screen intersect with each other to form a wedge angle of the wedge; and wherein the information is projected onto the inner side of the screen, the wedge angle is $\beta$ and satisfies $\beta=(2-n)\times n_2\alpha/2n^2$, where n is a refractive index of the screen, $n_2$ is a refractive index of the transparent film, and $\alpha=nL(R+h)/Rh$, where L is a distance between an incidence point where the light ray reflected at the inner surface of the screen is incident on the inner side of the screen and an exit point where the same light ray exits from the inner side of the screen, R is a curvature radius of the inner side of the screen, and h is a thickness of the screen.

2. The head up display device according to claim 1, wherein
the screen is a glass screen; and
the transparent film is provided on an inner side of the glass screen or provided in an interior of the glass screen, and a curvature radius of the inner side of the glass screen is less than that of an outer side of the glass screen.

3. The head up display device according to claim 2, wherein the transparent film is arc-shaped, has a curvature matching to that of the glass screen, and has a bending direction matching to that of the glass screen.

4. The head up display device according to claim 1, wherein the transparent film is arc-shaped, has a curvature matching to that of the screen, and has a bending direction matching to that of the screen.

5. The head up display device according to claim 1, wherein $|n-n_2|\leq 0.3$.

6. The head up display device according to claim 1, wherein the transparent film is made of a material having thermal insulation properties.

7. A vehicle comprising the head up display device according to claim 1.

8. The vehicle according to claim 7, wherein
the screen is a glass screen; and
the glass screen of the head up display device serves as a front windshield of the vehicle, a position where the transparent film of the head up display device is provided on the front windshield corresponds to positions of the human eyes, and a wedge angle of the transparent film is close to a lower side of the front windshield.

9. The vehicle according to claim 7, wherein
the screen is a glass screen; and
the vehicle comprises an automobile, a train, or an airplane.

* * * * *